C. B. YAW.
TYPE WRITING MACHINE.
APPLICATION FILED JUNE 1, 1908.
920,410.
Patented May 4, 1909.
4 SHEETS—SHEET 3.
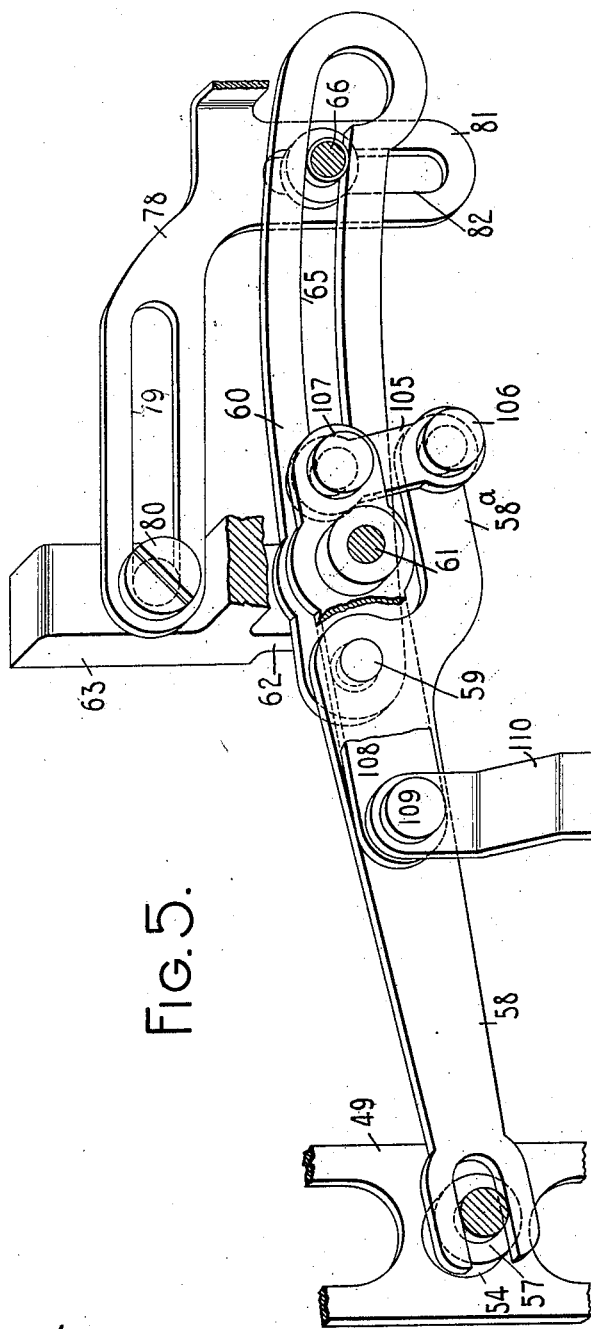
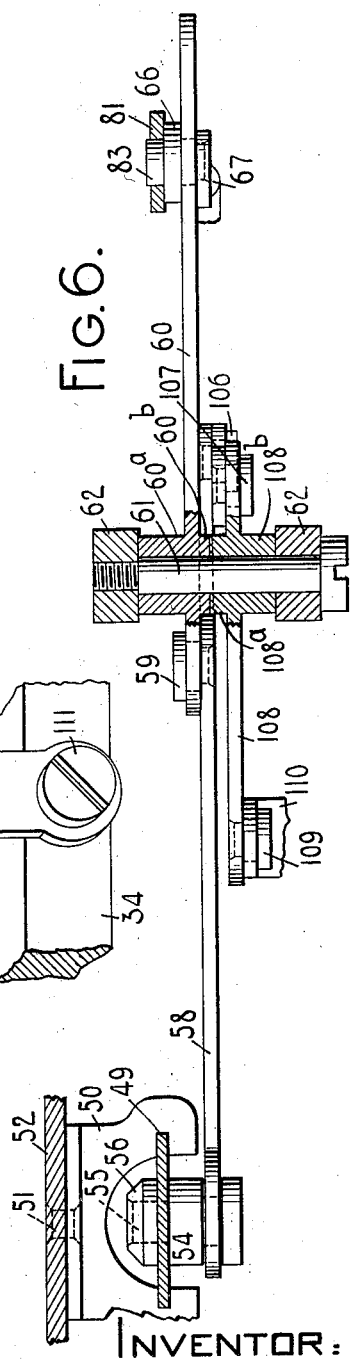
WITNESSES:
E. M. Walls.
M. W. Pool.
INVENTOR:
Chas. B. Yaw
By Jacob Felbel
HIS ATTORNEY

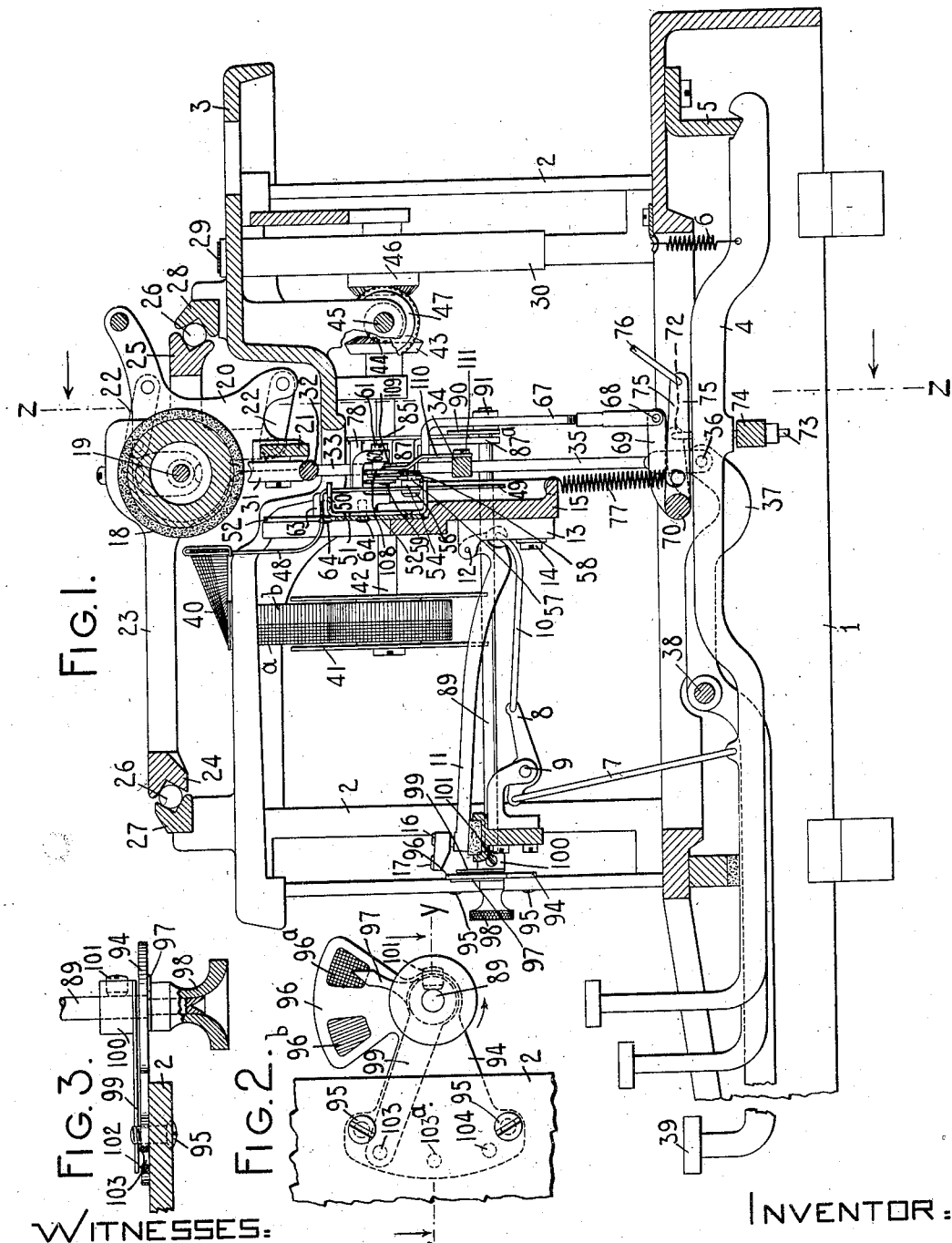

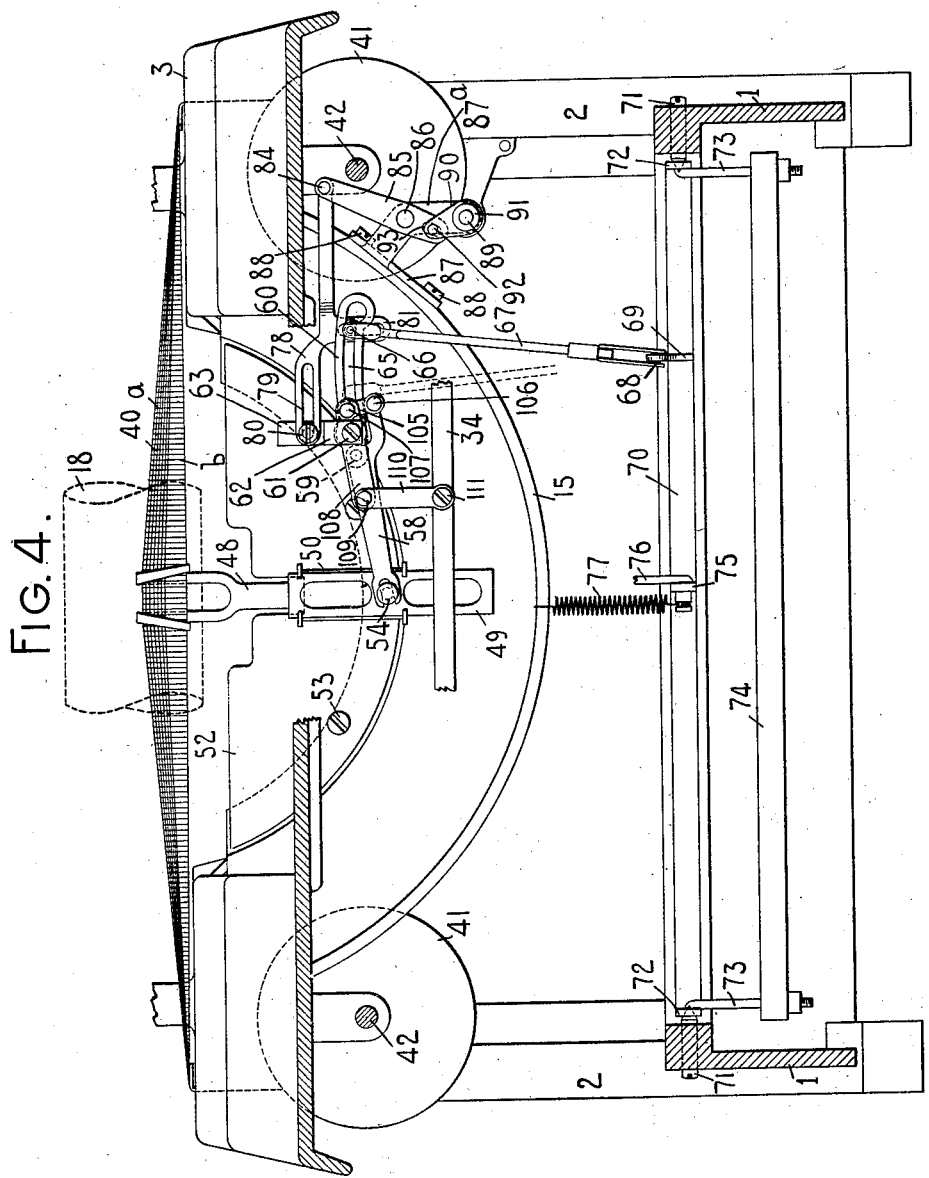

UNITED STATES PATENT OFFICE.

CLIO B. YAW, OF ARLINGTON, NEW JERSEY, ASSIGNOR TO WYCKOFF, SEAMANS & BENEDICT, OF ILION, NEW YORK, A CORPORATION OF NEW YORK.

TYPE-WRITING MACHINE.

No. 920,410.　　　　Specification of Letters Patent.　　　Patented May 4, 1909.

Application filed June 1, 1908. Serial No. 435,926.

*To all whom it may concern:*

Be it known that I, CLIO B. YAW, citizen of the United States, and resident of Arlington, in the county of Hudson and State of New Jersey, have invented certain new and useful Improvements in Type-Writing Machines, of which the following is a specification.

My invention relates especially to ribbon mechanisms for typewriting machines and its object, generally stated, is to provide improved devices of the class specified.

To the above and other ends, the invention consists in the features of construction, combinations of devices and arrangements of parts hereinafter described and particularly pointed out in the claims.

The invention is shown as applied to a front-strike typewriting machine of the shifting platen style, but the nature of the invention is such that it may be adapted to other kinds of writing machines.

Figure 7:
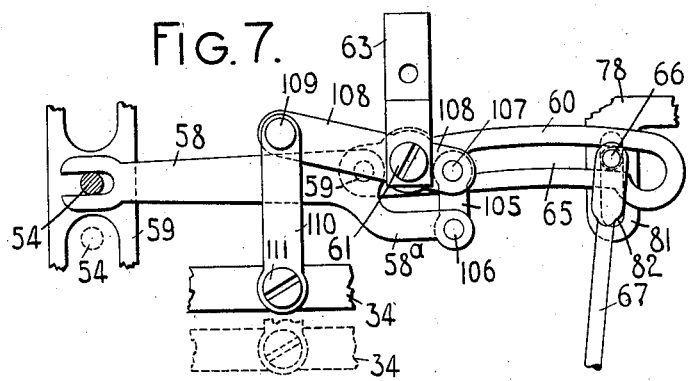
Figure 8:
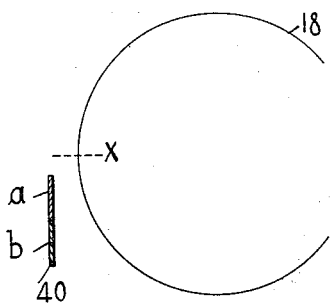
Figure 9:
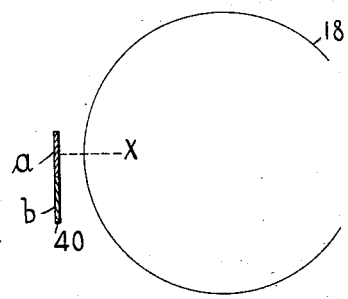
Figure 10:
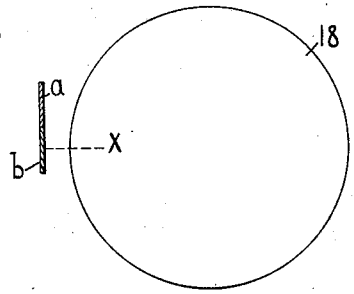
Figure 11:
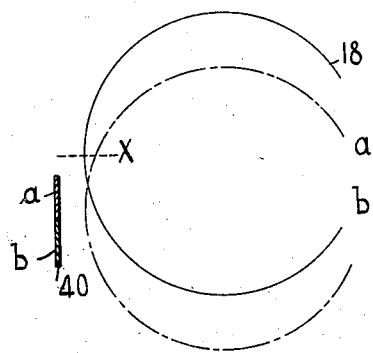
Figure 12:
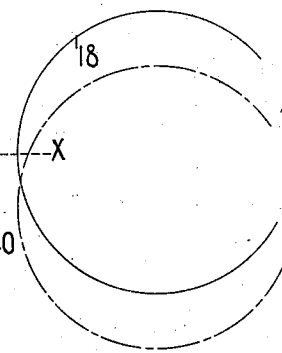
Figure 13:
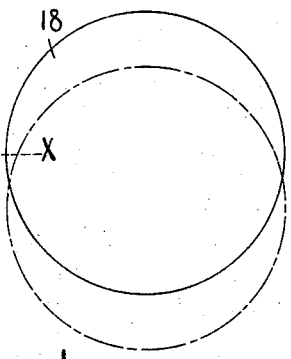

In the accompanying drawings which illustrate one form of the invention, Figure 1 is a vertical front to rear sectional view of a typewriting machine embodying my invention, said view being taken about centrally of the machine, parts of which are omitted and parts broken away. Fig. 2 is a fragmentary front elevation illustrating indicating and hand-positioning devices comprised in my invention. Fig. 3 is a horizontal sectional view taken on a plane represented by the line y—y in Fig. 2 and looking in the direction of the arrows at said line. Fig. 4 is a sectional view taken on a plane represented by the line z—z in Fig. 1 and looking in the direction of the arrows at said line, some of the parts shown in Fig. 1 being omitted from Fig. 4 and other parts broken away. Fig. 5 is a perspective view, looked at from the rear, of a novel construction of operating lever for the vibratory ribbon carrier and of various parts associated with said lever. Fig. 6 is a top view partly in section of the parts shown in Fig. 5. Fig. 7 is a rear elevation of the parts shown in Fig. 5 but showing certain of said parts in different relations from those in which they appear in Fig. 5. Figs. 8 to 10 inclusive are diagrammatic views illustrating various relations between the printing portion of the ribbon and the platen when said platen is in lower case position. Figs. 11 to 13 inclusive are diagrammatic views illustrating various relations between the printing portion of the ribbon and the platen when said platen is in shifted or upper case position.

Referring first more especially to Figs. 1 and 4, the main frame of the machine is shown as comprising a base 1, corner posts 2 and a top plate 3. Key levers 4 are fulcrumed at 5, each key lever being provided with a restoring spring 6 and being connected by suitable actuating devices (comprising a link 7, a lever 8 having a fixed pivot 9, and a link 10) with a type bar 11 pivoted at 12 to a hanger 13. The hangers are secured each by a screw 14 to a vertically disposed segmental support 15, said support in the present instance being stationary and suitably secured to the frame of the machine. The type bars are each provided with a lower case type 16 and an upper case type 17 and when actuated are adapted to coöperate with the front face of a platen 18, the axle 19 whereof is journaled in the side bars 20 of a platen frame or carrier which further comprises a cross bar 21 connecting said side bars. Links 22 connect the platen carrier with the platen carriage, said carriage comprising end bars 23 and front and rear bars numbered respectively 24 and 25. The bars 24 and 25 are grooved to coöperate with anti-friction balls 26, said balls also coöperating with grooved front and rear guide rails numbered respectively 27 and 28, said rails being fixed to the frame of the machine above the top plate. The carriage is connected by the usual strap 29 with a spring drum 30 which constantly urges the carriage leftward across the top plate. The leftward movement of the carriage is controlled by the usual or suitable letter feeding or escapement devices (not shown) which are operative by the key levers 4.

During the to-and-fro movements of the carriage, platen carrier and platen across the top plate, a roller 31 on the platen carrier coöperates with a guide rail 32 to maintain the platen carrier and the platen in predetermined relation with the carriage. This relation will not be varied except when the platen and platen carrier are shifted or moved up and down in the carriage to change case by means operative on the guide rail 32 through a shiftable frame on which said rail is supported. Said frame comprises side rods 33 at the top of which the rail 32 is fixed. The rods 33 are supported at their lower ends on a cross bar 34 and are movable up and down through openings in the top plate. The bar 34 is carried by supporting rods 35 which are pivotally connected at 36 with shift levers 37, one at each side of the machine, said levers being mounted on a rock shaft 38 and each being provided with a key 39. Only one of each of the pairs of rods 35 and rods 33, and only one lever 37 are shown in the drawings. It will be understood, however, that the shift frame in which these parts are comprised supports the rail 32 near the ends thereof and is shiftable by a key 39 at each side of the keyboard, as is more fully illustrated in my pending application Serial No. 416,080, filed February 15th, 1908. The shiftable frame in itself was not invented by me and is not claimed herein *per se*.

A ribbon 40 is secured to and wound upon ribbon spools 41, said ribbon spools being vertically disposed beneath the top plate, one at each side of the machine and forward of the platen (Figs. 1 and 2). Each ribbon spool is secured at the forward end of a horizontal shaft 42 journaled in lugs depending from the top plate. As more fully illustrated in my said pending application, each shaft 42 carries at its rear end a beveled pinion 43 which is adapted to coöperate with a beveled driving pinion 44 secured to a driving or power shaft 45, the latter being connected with and adapted to receive motion from the spring drum 30 through a train of devices comprising beveled pinions 46 and 47 which are always in mesh with each other. The pinion 47 is slidably connected with the driving shaft 45 but always turns therewith, so that without disengaging the pinions 46 and 47 the shaft 45 may be moved endwise to connect one or the other of the driving pinions 44 with its associate pinion 43, thereby causing the associate ribbon spool to be turned to wind the ribbon thereon. Any other suitable means may be employed to connect the shaft 45 with the pinion 47 to cause said pinion to turn said shaft, while at the same time permitting independent endwise movement of said shaft.

Midway between the ribbon spools the ribbon 40 is threaded through slots in a vibratory ribbon carrier or vibrator 48. Said ribbon carrier is vertically disposed and at its lower end curves toward the rear and terminates in a stem 49 extending vertically downward behind the segment 15 and guided and supported on a bracket 50 suitably secured as by rivets 51 to the rear of the usual segmental plate 52, said plate in turn being fastened to the segment 15 by screws 53.

As clearly shown in Figs. 5 and 6, the ribbon carrier is provided with a rearwardly extending stud 54, the stem 55 whereof extends through a hole in the ribbon carrier part 49 and receives a washer or nut 56. The end of the stem 55 is spread or up-set in a counter-sink in the washer 56 so that the stud 54 is firmly clamped to the ribbon carrier. The stud serves to connect the ribbon carrier with its operating lever, said stud being provided with a circumferential groove or depression 57 which coöperates with the slotted inner or right-hand end portion of one part 58 of the operating lever. The lever part 58 extends from the ribbon carrier toward the left-hand side of the machine behind the segment 15, as will be understood from Figs. 4 and 5, which it will be recalled, are both rear views. The part 58 is pivotally connected at 59 with the outer or principal part 60 of the operating lever, said part 60 being in itself a lever and fulcrumed on a screw 61, which screw or fulcrum is supported on the arms 62 of a bracket which further comprises an upwardly extending portion 63, said bracket being secured at the rear of the plate 52 by screws 64 passing through holes in the plate 52 and engaging threaded openings in the bracket. The pivot 59 is on the forward arm of the part 60 and the rear arm of said part 60 is provided with a slot 65 extending longitudinally of the part and coöperating with actuating devices which communicate vibratory movements to the ribbon carrier during printing operations. During the vibratory movements the relations between the parts 58 and 60 of the operating lever are controlled by means presently to be described.

The actuating devices for the operating lever comprise a stud or rivet 66 which engages the slot 65 in the part 60 and is secured at the upper end of a link 67, said link curving rearward and then extending downward, as shown in Figs. 1 and 4, the lower end of said link being pivoted at 68 to an arm 69 integral with and extending rearward from a rock shaft 70. The rock shaft is pivoted on screws 71 supported in the sides of the base and at its ends is provided with rearwardly extending arms 72 which carry depending arms or links 73, said links supporting a universal bar 74 which extends from side to side of the machine beneath the key levers 4. When a key lever is depressed the universal bar is lowered, turning the rock shaft 70 on its pivots and operating the escapement devices or letter feed devices, with which said rock shaft is connected by means comprising a central arm 75 and a link 76 extending upward therefrom. A suitable spring 77 maintains the universal bar and the rock shaft 70 in normal position.

When the rock shaft 70 is turned by the operation of a printing key lever the link 67 is drawn downward, turning the part or member 60 on its fulcrum 61 and swinging bodily upward the part 58 and the ribbon carrier connected therewith so as to cause the ribbon to cover the printing point on the platen.

Means are provided for varying the vibratory movement of the ribbon carrier so as to enable different widthwise portions of the ribbon to be made use of. Said means may be employed in connection with a ribbon of uniform character throughout, but is especially useful with a ribbon like that shown in the drawings and numbered 40, which ribbon is divided into longitudinal fields $a$ and $b$ of different characteristics. The field $a$ may, for example, be of one color such as black and the field $b$ of a different color such as red. In the present instance, the variation in the vibration of the ribbon carrier is a change in the extent of throw and is brought about by alternating the position of the stud 66 in the slot 65 relatively to the fulcrum 61, which is accomplished by swinging the link 67 on its pivot 68 longitudinally of the part 60 and toward and away from the middle of the machine.

The swinging movements of the link 67 are controlled by hand-operated devices comprising a slide bar 78 (Figs. 4 and 5), said slide bar being provided with a slot 79 which is engaged by a headed guide screw 80 on the bracket arm 63, said screw 80 serving to support and guide the inner end portion of the slide bar. Said slide bar is provided with a downward extension 81 formed with a slot 82 which engages and controls a boss 83 (Fig. 6) formed on and projecting from the stud 66 at the side of the part 60 opposite from the link 67. The slide bar 78 has a rearward bend just to the left of the extension 81 and from the bend the slide bar extends horizontally leftward and is pivotally connected at 84 with the upper arm of a lever 85 (Figs. 1 and 4). The lever 85 is fulcrumed at 86 on a bracket 87 which is secured to the under face of the segment 15 by screws 88. From the segment 15 the bracket 88 first extends toward the rear of the machine over the bar 34 and then is bent or extended downward behind said bar as indicated at 87ª, the extended part 87ª supporting the fulcrum 86 and at its lower end providing a journal for the rear end portion of a rock shaft 89 which extends horizontally forward toward the front of the machine. The rear end portion of the rock shaft behind the extension 87ª supports a crank arm 90 which is provided with a hub 91, said hub fitting over the end of the shaft 89 and being suitably secured thereto. The outer end of the crank arm 90 is provided with a pin or stud 92 which engages in a slot 93 formed in the lower arm of the lever 85, the pin and slot connection 92, 93 coupling the crank arm 90 with the lever 85 so that rotary motion communicated to the crank arm from the shaft 89 will be transmitted through the lever 85 to the slide bar 78 and will move said slide bar longitudinally. As shown in Figs. 1, 2 and 3, the forward end portion of the shaft 89 is journaled in a plate 94 which is secured by screws 95 against the rear face of the left-hand front corner post 2. The plate 94 has an upward extension 96 provided with two indicating surfaces 96ª and 96ᵇ corresponding respectively to the fields $a$ and $b$ of the ribbon 40. Coöperative with the indicating surfaces is a pointer 97 which is suitably secured to the shaft 89 in front of the plate 94. The front end portion of the shaft 89 receives a finger button 98 which is suitably secured in place, and by which the shaft 89 may be given rotary movements in opposite directions. The rotary movements of the shaft 89 are limited by an arm 99 having a hub portion 100 which is secured to the shaft 89 by a set screw 101. The arm is adapted to contact with the stems of the screws 95 which project rearward beyond the plate 94 and serve as stops to limit the movement of the arm 99 and shaft 89. The arm 99 is preferably made of spring metal and its free end is provided with a rounded protuberance or projection 102 which is adapted to engage with holes 103 and 104 in the plate 94 to hold the arm 99 after it has been arrested by the stops 95, thus maintaining the arm 99, shaft 89 and connected parts in predetermined positions.

When the arm 99 is positioned as shown in Fig. 2 the pointer 97 will be opposite the indicating surface 96ª which corresponds to the ribbon field $a$ and the stud 66 will be near the left-hand end of the slot 65 and at its operative position farthest from the fulcrum 61 of the operating lever. The parts are so proportioned and arranged that if the printing keys are operated at this time the ribbon carrier will be given a throw or vibratory movement upward sufficient only to bring the field $a$ of the ribbon opposite the printing point on the platen. The throw will be a constant one and the types will follow a straight path lengthwise of the upper field $a$.

If it be desired to make use of the lower field $b$ of the ribbon the finger button 98 may be grasped and turned in the direction of the arrow in Fig. 2, disengaging the spring arm 99 from the positioning hole 103, and causing said arm to swing downward until arrested by the lower screw 95 at which time the rounded projection 102 will be in engagement with the hole 104. The rotary movement thus communicated to the rock shaft 89 will operate through the crank arm 90 and lever 85 to slide the bar 78 inward on its screw support 80 and will cause the slotted extension 81 to move the stud 66 inward toward the fulcrum 61, at the same time swinging the link 67 from the full line position in Fig. 4 until it reaches the dotted line position in said figure. It will be understood that the movements of the link 67 received from the printing keys will be of the same extent in its dotted line position as in its full line position. Consequently because of the fact that in its new position the stud 66 is nearer to the fulcrum 61, the operating lever will be given a greater extent of vibratory movement, this greater extent of movement being sufficient to present the lower field $b$ of the ribbon to the types which will follow a straight path lengthwise of the field $b$ until the stud 66 and link 67 are again shifted by the turning back of the finger button 98.

Referring to the diagrammatic views, Figs. 8–10, the normal relation between the ribbon 40 and the platen when in lower case position is shown in Fig. 8. Fig. 9 shows the ribbon field $a$ in printing position, the printing point being indicated by the dotted line $x$. Fig. 10 shows the lower ribbon field $b$ in printing position. Comparing Figs. 9 and 10 the difference in extent of throw due to the resetting of the stud 66 nearer the fulcrum 61 will be noted.

It will be understood that in both positions of the slide bar 78 the slot 82 in the extension 81 permits uninterrupted downward and upward vibratory movements of the stud 66, said slot coöperating with the boss 83 to confine the stud 66 to predetermined paths.

As has been stated, means are provided for controlling the relation between the two parts of the operating lever during the printing or vibratory movements of the ribbon. The operating lever is made in two parts to enable one of the parts to be shifted relatively to the other automatically during the platen shifting operation, so as to compensate for the platen shift and enable the normal relation of the printing portion of the ribbon to the printing point on the platen to remain unaltered as a result of the shifting of the platen. The devices for controlling the relation between the two parts of the operating lever comprise a link 105 which is pivotally connected at 106 to a tail or extension 58$^a$ on the lever part 58, said tail 58$^a$ extending toward the left below the fulcrum 59. The link 105 extends upward from the pivot 106 and is pivotally connected at 107 with a lever 108, said lever being fulcrumed on the screw 61 and being pivotally connected at 109 with an arm 110 extending upward from the shiftable bar 34 and secured thereto by a headed screw 111.

As shown in Fig. 6, the lever member 60 is provided with a hub portion 60$^a$ which receives the fulcrum screw 61 and abuts one of the bracket arms 62. The member 60 is further provided with an oppositely extending shorter hub portion 60$^b$ which abuts against a corresponding hub portion 108$^a$ formed on the lever 108. The lever 108 is further provided with an oppositely extending hub portion 108$^b$ which abuts against the other bracket arm 62. The parts are so constructed that the member 60 and the lever 108 may turn on the fulcrum 61 between the bracket arms 62 but are held from endwise motion on said fulcrum 61 so that they will always be confined to the same plane of rotation. It will further be noted that as illustrated the various pivots 59, 106, 107 and 109 are in the nature of shouldered rivets, the stems whereof engage in holes in the associate supports, said holes having countersunk portions. The ends of the stem portions of said rivets are spread or upset in the associate countersinks so that the spread portion of each rivet and the shoulder thereof coöperate to secure it firmly to its support and the shouldered portion next the head of the rivet serves as a bearing for the part with which it coöperates. It will be understood, however, that any other suitable form of pivotal connection may be employed at pleasure.

When the member 60 is vibrated on its fulcrum 61, through the printing keys acting on the stud 66, the pivot 59, carried on the member 60, will be correspondingly vibrated and the part 58, supported on the pivot 59, will be bodily raised and lowered. During these vibratory movements the part 58 will be controlled, so far as rotative movement on its pivot 59 is concerned, by the link 105, the upper pivotal point of connection 107 of this link remaining fixed during these vibratory movements of the member 60. By reason of the controlling of the part 58 as just described, the relation it will bear to the part 60 when in printing position can be accurately predetermined, and the throw communicated to the part 58 through the parts 60 can be adjusted readily so as to present predetermined portions of the ribbon at the printing point at will. When the actuating stud 66 is set in the position farthest from the fulcrum 61, vibratory movements communicated to the part 60 will be transmitted to the part 58 so as to cause said part 58 to raise the ribbon carrier far enough only to present the upper ribbon field to the printing point. When the actuating stud is set in its operating position nearest the fulcrum 61, the part 60 and the coöperating link 105 will operate to lift the part 58, causing the latter to raise the ribbon carrier far enough to present the lower ribbon field to the types.

If at any time it is desired to change from lower to upper case, one of the shift keys 39 may be operated, lifting the shift frame and the platen so that the upper case type 17 will coöperate with the platen instead of the lower case type 16 as theretofore. When the shiftable frame is raised the part or bar 34 comprised in said frame will be raised from the dotted line position shown in Fig. 7 to the full line position shown in said figure, and the arm 110 fixed to the bar 34 will also be raised to a new position as shown by full lines in Fig. 7. As the arm 110 moves upward during the platen shifting operation said arm will raise that arm of the lever 108 with which it is pivotally connected at 109 and will lower the other arm of said lever 108, forcing downward the link 105 pivoted to said other arm at 107. The link in its downward movement operates on the tail 58$^a$ of the part 58, causing the tail to swing downward about the pivot 59 and the body portion of the part 58 to swing upward on said pivot, the result being that the relation between the two parts of the operating lever will be altered by the platen shifting movement from that shown in Figs. 4 and 5 to that shown in Fig. 7. The raising of the body portion of the part 58 operates through the stud 54 to lift the ribbon carrier automatically with the platen so that the normal relation between the printing portion of the ribbon, or that portion between the slots in the ribbon carrier, will not be altered by reason of the platen shift but will be the same subsequent to the shift as prior thereto. The part 60 of the operating lever will remain quiescent during the automatic change of position of the part 58 and the ribbon carrier resulting from the shifting of the platen, and consequently the automatic movement of the ribbon carrier and part 58 with the shifting platen will take place irrespective of the relation of the actuating stud 66 with its slot 65; that is to say, the automatic shifting will be the same whether the stud is set in its operative position farthest from the fulcrum 61 or in its operative position nearest to said fulcrum; and after such automatic shifting, the vibratory movements communicated through the actuating stud to the ribbon carrier and ribbon will be the same in character and extent as prior to the shifting.

Figs. 11 to 13 inclusive illustrate the different relations between the printing portion of the ribbon and the platen when in shifted or upper case position. Fig. 11 shows the normal relation between ribbon and platen. Fig. 12 shows the ribbon field $a$ in working position and Fig. 13 the ribbon field $b$ in working position. On comparing these figures with Figs. 8-11 it will be seen that the corresponding relations between the platen and the ribbon are the same in both case positions.

When the platen is shifted back to lower case position the arm 110 will operate on the lever 108 and link 105 to return the parts 58 and 60 of the operating lever from the relation shown in Fig. 7 to that shown in Fig. 5, automatically lowering the ribbon carrier and the printing portion of the ribbon with the platen so that the normal relation will remain unaltered.

It will be observed that by my present invention I provide ribbon mechanism combined with a shiftable platen and platen shifting devices therefor, said ribbon mechanism comprising a two-part operating lever, the first or main part of said operating lever having a fixed fulcrum and being provided with a longitudinally extending slot and carrying the second part of said operating lever which is pivoted to said first or main part and has a direct pivotal connection with the vibratory ribbon carrier; that means are provided for controlling the relation between the two operating-lever parts, said means comprising a link pivotally connected with a tail or extension on one of the operating lever parts; that said link is also pivotally connected with a second lever which has the same fulcrum as the operating lever and consequently has an axis of rotation coincident with the axis of rotation of said operating lever; and that connections are provided between said second lever and said platen shifting devices, said connections comprising an arm to which said second lever is pivotally connected, said arm being secured to a shiftable bar comprised in said platen shifting devices.

Various changes may be made without departing from my invention. For example, the plate 94 may be provided with another hole 103$^a$ (Figs. 2 and 3) midway between the holes 103 and 104. When a uniform ribbon is employed, the arm 99 may be set by bringing the protuberance 102 into engagement with the hole 103$^a$ so that the ribbon may be written on in a third path midway between the paths followed by the types when the holes 103 and 104 are employed to set the mechanism.

What I claim as new and desire to secure by Letters Patent, is:—

1. In a typewriting machine, the combination of a vibratory ribbon carrier, a two-part operating lever therefor, means for holding the two parts of said lever in one or another of a plurality of normal relations, said means comprising a link pivoted directly to one part of said operating lever and also pivoted to a supporting part, and means for actuating said operating lever at printing operation.

2. In a typewriting machine, the combination of a vibratory ribbon carrier, a two-part operating lever therefor, means for holding the two parts of said lever in one or another of a plurality of normal relations, said means comprising a link pivoted to one part of said operating lever and a second lever to which said link is also pivoted, and means for actuating said operating lever at printing operation.

3. In a typewriting machine, the combination with a platen and platen shifting devices, of a vibratory ribbon carrier, a two-part operating lever therefor, means for holding the two parts of said lever in one or another of a plurality of normal relations, said means comprising a link pivoted to one part of said lever, a second lever to which said link is also pivoted, connections between said second lever and said platen shifting devices, and means for actuating said operating lever at printing operation.

4. In a typewriting machine, the combination with a platen and platen shifting devices, of a vibratory ribbon carrier, a two-part operating lever, one lever part having a fixed fulcrum and pivotally supporting the other part, a link pivoted to said other part, a second lever to which said link is also pivoted, and connections between said second lever and said platen shifting devices.

5. In a typewriting machine, the combination with a platen and a shiftable frame connected therewith, of a vibratory ribbon carrier, a two-part operating lever, one lever part having a fixed fulcrum and pivotally supporting the other part, a link pivoted to said other part, a second lever to which said link is also pivoted, and an arm mounted on said shiftable frame and to which said second lever is pivotally connected.

6. In a typewriting machine, the combination with a platen and platen shifting devices, of a vibratory ribbon carrier, a two-part operating-lever therefor, one lever part having a fixed fulcrum and carrying the other part, a second lever connected with said platen shifting devices and having an axis of rotation coincident with the axis of rotation of said operating lever, and connections between said second lever and said operating lever.

7. In a typewriting machine, the combination with a platen and platen shifting devices, of a vibratory ribbon carrier, a two-part operating-lever therefor, the first part of said operating-lever having a fixed fulcrum and the second part of said operating lever being pivoted on said first part, a second lever having an axis of rotation coincident with the axis of rotation of said operating-lever, connections between said second lever and said platen shifting devices, a link connecting said second lever and said second part of said operating-lever, and means for actuating said operating-lever at printing operation.

8. In a typewriting machine, the combination with a platen and platen shifting devices, of a vibratory ribbon carrier, a two-part operating-lever therefor, the first part of said operating-lever having a fixed fulcrum and the second part of said operating-lever being pivoted on said first part, a second lever having an axis of rotation coincident with the axis of rotation of said operating-lever, connections between said second lever and said platen shifting devices, a link connecting said second lever and said second part of said operating-lever, and key operated means connected with said first part of said operating-lever.

9. In a typewriting machine, the combination with a platen and platen shifting devices comprising a shiftable bar, of a vibratory ribbon carrier, an operating-lever therefor comprising two parts, the first part having a fixed fulcrum and the second part being pivoted on the first part and being provided with a tail or extension, a second lever having a fixed fulcrum, a link connecting one arm of said second lever with said tail or extension, an arm secured to said shiftable bar and pivotally connected with said second lever at the side of its fulcrum opposite from said link, and means for actuating said operating-lever at printing operation.

10. In a typewriting machine, the combination with a platen and platen shifting devices, of a vibratory ribbon carrier, a two-part operating-lever therefor, the first or main part of said operating-lever having a fixed fulcrum, the second part of said operating-lever being pivoted on the first part and having a pivotal connection with said ribbon carrier, a second lever having connections with said platen shifting devices, a link connecting said second lever with said second part of said operating-lever, a key actuated universal bar, and connections between said universal bar and the first or main part of said operating-lever.

11. In a typewriting machine, the combination of a vibratory ribbon carrier, a two-part operating-lever therefor, means for holding the two parts of said lever in one or another of a plurality of normal relations, said means comprising a link pivoted directly to one part of said operating-lever and also to a supporting part, means for actuating said operating-lever at printing operation, and hand actuated means for controlling said last recited means to vary the vibratory movements of said operating-lever at printing operation.

12. In a typewriting machine, the combination with a platen and platen shifting devices, of a vibratory ribbon carrier, a two-part operating-lever therefor, means for holding the two parts of said lever in one or another of a plurality of normal relations, said means comprising a link pivoted to one part of said lever, a second lever to which said link is also pivoted, connections between said second lever and said platen shifting devices, means for actuating said lever at printing operation, and hand actuated means for controlling said last recited means to vary the vibratory movements of said operating-lever at printing operation.

13. In a typewriting machine, the combination with a platen and platen shifting devices, of a vibratory ribbon carrier, a two-part operating-lever therefor, the first part of said operating lever having a fixed fulcrum and the second part of said operating lever being pivoted on said first part, a second lever having an axis of rotation coincident with the axis of rotation of said operating-lever, connections between said second lever and said platen shifting devices, a link connecting said second lever and said second part of said operating lever, means for actuating said operating-lever at printing operation, and hand actuated means for controlling said last recited means to vary the vibratory movements of said operating lever at printing operation.

14. In a typewriting machine, the combination with a platen and platen shifting devices, of a vibratory ribbon carrier, a two-part operating-lever therefor, the first or main part of said operating-lever having a fixed fulcrum, the second part of said operating lever being pivoted on the first part and having a pivotal connection with said ribbon carrier, a second lever having connections with said platen shifting devices, a link connecting said second lever with said second part of said operating lever, a key actuated universal bar, connecting devices comprising an actuating link between said universal bar and the first or main part of said operating-lever, and hand actuated means for setting said actuating link in different normal relations with said main part of the operating-lever in order to vary the vibratory movements of said ribbon carrier.

15. In a typewriting machine, the combination with a platen and platen shifting devices, of a vibratory ribbon carrier, an operating-lever part pivotally connected therewith, a main operating-lever part on which said first named lever part is pivoted, said main part having a fixed fulcrum and being provided with a longitudinally extending slot, a second lever having the same fulcrum as said operating lever, a link connecting said second lever with the first named operating-lever part, connections between said second lever and said platen shifting devices, a key actuated universal bar, a link connected with said universal bar and engaging the slot in said main operating-lever part, and hand controlled means for setting said link normally at different points lengthwise of said slot.

16. In a typewriting machine, the combination of a vibratory ribbon carrier, an operating-lever therefor, a key operated universal bar, an actuating link connected with said universal bar and operative on said lever, and means for varying the normal relation between said link and said lever, said means comprising a slide bar which also guides said link when said link is actuated to operate said lever.

17. In a typewriting machine, the combination of a vibratory ribbon carrier, an operating-lever therefor, a key operated universal bar, an actuating link connected with said universal bar and operative on said lever, a slide bar operatively connected with said link, and hand controlled devices comprising a lever pivotally connected with said slide bar, a rock shaft having a crank arm pivotally connected with said last named lever, and a finger button on said rock shaft.

18. In a typewriting machine, the combination of a vibratory ribbon carrier, an operating-lever therefor, a key operated universal bar, an actuating link connected with said universal bar and operative on said lever, a slide bar operatively connected with said link, hand controlled devices comprising a lever pivotally connected with said slide bar, a rock shaft having a crank arm pivotally connected with said last named lever, indicating devices comprising a pointer secured to said rock shaft, and a coöperating indicating plate secured to the frame of the machine.

19. In a typewriting machine, the combination with a two-color ribbon mechanism, of indicating devices comprising a rock-shaft extending to the front of the machine, a pointer fixed to said rock-shaft, an indicating plate provided with color indicators and secured to the machine frame, means for arresting the turning movements of said rock shaft in both directions, and means coöperating with certain parts of said first recited means to maintain said rock shaft in either of its arrested positions.

20. In a typewriting machine, the combination with a two-color ribbon mechanism, of indicating devices comprising a rock-shaft extending to the front of the machine and provided with a finger wheel, a pointer fixed to said rock-shaft, a fixed plate provided with color indicators, a detent device fixed to said rock-shaft and coöperating with devices on said plate to hold the rock-shaft in predetermined positions, and means coöperating with said detent device to arrest it and limit its movement in both directions.

21. In a typewriting machine, the combination of a vibratory ribbon carrier, an operating lever therefor, a key operated universal bar, an actuating link connected with said universal bar and operative on said lever, means for varying the normal relation between said link and said lever, said means comprising a slide bar and a rock-shaft, and devices for limiting the extent of rotary movement of said rock-shaft and for maintaining it in one or another of a plurality of set positions.

Signed at the borough of Manhattan, city of New York, in the county of New York and State of New York this 29th day of May A. D. 1908.

CLIO B. YAW.

Witnesses:
CHARLES E. SMITH,
J. B. DEEVES.